(12) United States Patent
Gupta et al.

(10) Patent No.: US 6,322,356 B1
(45) Date of Patent: Nov. 27, 2001

(54) POLLUTION ABATEMENT REACTOR SYSTEM HAVING NONPRISMATIC STRUCTURED MEDIA

(75) Inventors: Ajay Gupta, West New York, NJ (US); Joseph Klobucar, Detroit, MI (US)

(73) Assignee: Durr Environmental, Inc., Wixom, MI (US)

( * ) Notice: Subject to any disclaimer, the term of this patent is extended or adjusted under 35 U.S.C. 154(b) by 0 days.

(21) Appl. No.: 09/670,236

(22) Filed: Sep. 28, 2000

(51) Int. Cl.$^7$ ...................................................... F27D 17/00
(52) U.S. Cl. ........................... 432/179; 432/180; 432/181; 165/9.1; 165/9.2
(58) Field of Search ..................................... 432/179, 180, 432/181; 165/9.1, 9.2, 9.3, 9.4, DIG. 30

(56) References Cited

U.S. PATENT DOCUMENTS

| | | | | |
|---|---|---|---|---|
| 695,822 | * | 3/1902 | Moore ................................... | 165/9.1 |
| 2,467,166 | * | 4/1949 | Thorpe ................................. | 165/9.1 |
| 2,634,118 | * | 4/1953 | Jantsch ................................. | 165/9.3 |
| 4,940,081 | * | 7/1990 | Hyde ..................................... | 165/9.1 |
| 5,154,224 | * | 10/1992 | Yasui et al. ................... | 165/DIG. 20 |
| 5,352,115 | | 10/1994 | Klobucar ............................. | 432/181 |
| 5,531,593 | | 7/1996 | Klobucar ............................. | 432/181 |
| 5,707,229 | | 1/1998 | Klobucar ............................. | 432/181 |
| 5,755,569 | * | 5/1998 | Berg et al. ........................... | 432/179 |

FOREIGN PATENT DOCUMENTS

0472605 B1   5/1990   (EP)   ................................ F23G/7/06

* cited by examiner

Primary Examiner—Jiping Lu
(74) Attorney, Agent, or Firm—Howard & Howard

(57) ABSTRACT

An apparatus for treating gaseous pollutants in an air stream such as a regenerative thermal oxidizer or a selective catalytic reduction system, including a reaction chamber wherein the reaction media bed within the chamber comprises a plurality of nonprismatic ceramic blocks each having end faces, side faces and a chamfered face extending at an angle relative to the side faces of the blocks. The ceramic blocks are stacked in end-to-end and side-to-side relation within the reaction chamber and the ceramic blocks each include spaced parallel passages extending through the end and chamfered faces. The chamfered faces of adjacent blocks form voids between the blocks promoting turbulent gas flow through the voids and equalizing the pressure within the reaction chamber. The ceramic blocks may be symmetrical, wherein only a portion of the gas flows into the voids between the blocks and the remainder flows through the channels through the end faces or the ceramic blocks may be nonsymmetrical, wherein the chamfered faces are located vertically opposite an end face, such that all of the gas flowing through the reaction chamber flows through the gas passages into the voids between the blocks at alternative levels.

41 Claims, 4 Drawing Sheets

POLLUTION ABATEMENT REACTOR SYSTEM HAVING NONPRISMATIC STRUCTURED MEDIA

FIELD AND BACKGROUND OF THE INVENTION

The present invention relates to an improved gaseous pollutant abatement reactor system, such as a regenerative thermal oxidizer or selective catalytic reduction system including a gas reaction chamber, wherein the structured media bed in the reaction chamber comprises a plurality of ceramic blocks each having aligned gas passages extending through the end faces of the blocks and wherein the blocks include a chamfered surface extending at an angle relative to the side faces of the blocks which promotes gas flow between the blocks at spaced locations and equalizes the pressure within the reaction chamber.

Regenerative thermal oxidizers or RTOs are now widely used for oxidizing gaseous pollutants including volatile organic compounds, such as hydrocarbons, in waste or exhaust gas streams. A typical regenerative thermal oxidizer includes at least two heat exchange chambers each having a heat exchange media bed therein and a combustion chamber communicating with the heat exchange chambers. The waste gas stream is directed alternatively or periodically into one of the heat exchange chambers, which has been previously heated, and wherein the gaseous pollutant is oxidized. The gas then flows into the combustion chamber, wherein any remaining pollutants are oxidized. The combustion chamber is also used to preheat the gas flowing through the regenerative thermal oxidizer during startup and oxidize any remaining pollutants in the waste gas stream. The cleansed heated gas then flows into the second heat exchange chamber, heating the media in the second heat exchange chamber and the cleansed gas is vented to atmosphere. The gas flow through the regenerative thermal oxidizer is then reversed, such that the waste gas flows into the heat exchange media in the second heat exchange chamber, oxidizing the pollutants, etc. A regenerative thermal oxidizer thereby conserves heat resulting in a more efficient system.

There are basically two types of regenerative thermal oxidizers. The first type includes a plurality of generally spaced heat exchange chambers and a combustion chamber, generally located above the heat exchange chambers, and communicating with the chambers. A series of control valves then directs the gas through the heat exchange chambers as described above. The regenerative thermal oxidizer of this type may include three heat exchange chambers, wherein the exhaust gas is directed into one of the chambers for oxidation and the heated cleansed gas is directed into a second chamber, heating the heat exchange media in the second chamber as described above. The third chamber serves as a purge chamber, wherein any remaining pollutants in the heat exchange media are removed and generally circulated to the inlet of the regenerative thermal oxidizer or the purge gas is directed into the combustion chamber. By alternating the flow through the regenerative thermal oxidizer through the three heat exchange chambers, the pollutants in the process or exhaust gas is removed and oxidized without exhausting pollutants to the atmosphere and the heat exchange media is periodically cleaned.

A second type of regenerative thermal oxidizer, sometimes referred to as a rotary valve regenerative thermal oxidizer, includes a plurality of pie-shaped heat exchange chambers enclosed generally by a cylindrical wall or housing. A rotary valve is located below the heat exchange chambers which rotates to direct the gas containing the pollutants into a first adjacent series of heat exchange chambers, wherein the gas is heated and the pollutants are oxidized as described. A combustion chamber is located above the heat exchange chambers which receives the gas and removes any remaining pollutants as described above. The gas then flows downwardly through a second series of adjacent heat exchange chambers, wherein the heat exchange media bed is heated and the cleansed gas is vented to atmosphere. The remaining heat exchange chambers, usually located between the inlet heat exchange chambers and the outlet heat exchange chambers, serve as purge chambers, wherein the heat exchange media is cleaned. A rotary valve regenerative thermal oxidizer may utilize an inlet purge, wherein clean air is directed into the purge chambers, removing pollutants upwardly into the combustion chamber. Alternatively, some of the heated cleansed gas from the combustion chamber may be directed downwardly through the purge chambers, removing the pollutants in the purge chambers, and the pollutants are then generally circulated back to the inlet of the regenerative thermal oxidizer. The valve is continuously rotated to continuously change the function of the heat exchange chambers, providing continuous operation in a single vessel.

The media may also include or be coated with a catalyst resulting in a catalytic reaction within the reaction chamber to remove certain pollutants. As used herein, the term regenerative thermal oxidizer is intended to include conventional regenerative thermal oxidizers having ceramic media and ceramic media coated with a catalyst, sometimes referred to as catalytic reactors.

Another type of gaseous pollution abatement system is commonly referred to as a selective catalyst reduction or SCR system used primarily to treat NOx, including NO and $NO_2$. The ceramic media may be coated with a suitable catalyst or the catalyst may be mixed with the ceramic matrix prior to firing. Typical catalysts include noble metal catalysts, such as platinum, and base metal catalysts, such as vanadium or manganese oxide or Zeolite. A typical selective catalytic reduction system includes only one reaction chamber filled with a catalytic media bed as described. The gas to be treated flows through the bed of catalytic media in the reaction chamber where the NOx is reduced to nitrogen gas and nonpolluting oxides. Ammonia gas or other reducing agent may be introduced into the gas to effect NOx reduction. As used herein, the term gaseous pollution abatement system is intended to cover both regenerative thermal oxidizers and selective catalytic reduction systems.

Typically, gaseous pollution abatement systems have utilized a plurality of small elements of ceramic material as heat exchange or reaction media. The ceramic elements have included one inch ceramic saddle-shaped pieces or irregular mineral spheroids or gravel. Typically, the saddles or spheroids are poured into the heat exchange chambers and raked to form a bed of uniform depth. The individual pieces of the heat exchange media remain in whatever orientation they happen to fall into when the chamber is filled. The resistance to flow or pressure drop through the bed is relatively high and will vary through the media, depending upon the random orientation of the media and, to some extent, the degree of contamination. In a typical RTO or SCR having randomly oriented saddle-shaped ceramic elements, the overall pressure drop will be about ten inches of water, or greater.

More recently, loose particulate ceramic media has been replaced by structured ceramic media, such as disclosed in U.S. Pat. Nos. 5,707,229, 5,352,115 and 5,393,000 assigned to the assignee of the present application. As disclosed in these patents, the media bed may comprise blocks of ceramic material having generally parallel passages. The blocks of ceramic media, sometimes referred to as prismatic or prism-shaped blocks, have flat parallel rectangular end faces, perpendicular rectangular side faces and the parallel gas passages extending through the blocks through the end faces. The ceramic blocks are then stacked in side-to-side and end-to-end relation within the heat exchangers with the gas passages through the end faces generally coaxially aligned forming a bed of ceramic prismatic heat exchanger blocks. The gas to be treated flows upwardly through the parallel gas passages in the "inlet" heat exchange chamber or chambers, where the gas is heated and the pollutants oxidized as described above. The gas then flows upwardly into the combustion chamber and the heated cleansed gas flows downwardly from the combustion chamber through the ceramic monolith of prismatic ceramic blocks in the "outlet" heat exchange chamber or chambers which heats the ceramic media as described.

The gas passages through the parallel passages in the blocks of media bed typically have a diameter of less than one inch or more preferably between 0.1 to 0.25 inches. The dimension of the gas passages are selected to achieve the desired cross-sections for a particular application. The gas passages generally comprise at least 40 percent of the cross sectional area of the blocks and the pressure drop across the ceramic media bed is more than three inches of water. More preferably, the gas passages account for 50 to 80 percent of the total cross-sectional area and most preferably about 70 to 80 percent of the cross-sectional area.

A bed of structured heat exchange media comprised of prismatic ceramic heat exchange blocks as described above has several advantages over loose particulate ceramic elements as set forth in the above-referenced U.S. Patents. First, a greater degree of thermal or reaction efficiency is achieved with a lower pressure drop across the bed. Further, the pressure drop using prismatic structured media is predictable and does not depend upon the random orientation of the particulate ceramic media providing a more uniform flow through the media bed. Further, contaminates are less likely to be entrapped in the small parallel passages than within the interstices between the small, irregularly-shaped ceramic pieces. Finally, it has been found that purging of contaminates in the bed of structured media during the purge cycle is more efficient and sometimes more complete. This permits the system to operate with increased inlet and outlet times with a reduced amount of purge gas in a reduced purge cycle time. The use of prism-shaped structured media of this type, either coated with a suitable catalyst or having a catalyst mixed within the ceramic matrix, has similar advantages in a selective catalytic reduction system.

However, prism-shaped structured media of this type also has several important disadvantages. As set forth above, the prism-shaped ceramic blocks, which typically have a height of 300 mm and end faces having a width and length of the 150 mm, are stacked together to construct a bed of the desired cross-sectional area and height, wherein the gas passages through the end faces are aligned as described above. The disadvantages relate to the confined gas flow through the aligned gas passages and the constrained laminar flow through the height of the bed. The aligned passages through the stacked prismatic blocks prevents any cross-flow or redistribution of the gas within the bed. Consequently, any flow maldistribution at the entrance remains uncorrected and reduces the overall effectiveness or efficiency of the structured media because the ratio of the flow rate to the volume of structured media is not optimum.

As will be understood by those skilled in this art, the pressure across the inlet to the structured media is generally not uniform. Thus, for example, a greater percentage of the contaminated gas may flow through the stacked bed of prismatic structured media adjacent the inlet resulting in maldistribution at the entrance. This maldistribution of gas results in reduced thermal efficiency and a greater percentage of contaminates may collect in the stacks of prismatic ceramic blocks adjacent the inlet. To correct this maldistribution of gas, a longer purge cycle may be required in regenerative thermal oxidizers. Further, the small dimensions of the gas passages through the prism-shaped ceramic blocks limits the Reynold's number of the gas flow through the passages to the laminar regime and thus limits the heat transfer coefficient.

The use of prism-shaped structured catalytic media in a selective catalytic reduction system also suffers a further disadvantage. Because the destruction efficiency of the bed is dependant upon uniform distribution of the gas across the bed, the maldistribution of gas through a bed of prism-shaped ceramic blocks also results in reduced destruction efficiency. That is, the use of structured catalytic media results in both a reduction in thermal and destruction efficiency.

Thus, as will now be understood, although the prism-shaped ceramic blocks now used in structured media beds provides several advantages over loose particulate ceramic media, the prismatic structured media is responsible for the confined flow problem described above because of the prism geometry, which requires that the gas passages be continuous through the packing. The present invention permits the use of nonprismatic structured media blocks, but eliminates the problems set forth above by permitting the gas to circulate between the blocks of nonprismatic ceramic media and equalize the pressure and gas flow within the reaction chamber. The gas flow is thus increased into the turbulent regime at spaced locations, improving the heat transfer coefficient and substantially eliminating the gas flow maldistribution described. Providing more uniform gas flow through the bed is also particularly advantageous in selective catalytic reduction systems, improving the destruction efficiency of the system.

SUMMARY OF THE INVENTION

As set forth above, the gaseous pollution abatement system of this invention has improved nonprismatic structured media in the reaction chamber. As used herein, the term "reaction chamber" includes for example a heat exchange chamber of an RTO, wherein the reaction is an oxidation reaction, and a catalytic reaction chamber of an SCR, wherein the reaction is a reduction reaction. The bed of structured media comprises a plurality of ceramic blocks each having opposed end faces, side faces and generally parallel gas passages which extends through the ceramic blocks through the end faces. The ceramic blocks are stacked in side-to-side and end-to-end relation within the reaction chamber with the gas passages which extend through the end faces generally coaxially aligned and forming a bed of ceramic blocks with a portion of the gas flowing through the bed through the gas passages as described above. However, each of the ceramic blocks are nonprismatic and include a chamfered surface or surfaces, preferably extending at an angle relative to the side faces, with the gas passages extending through the chamfered surface providing gas flow between the ceramic blocks and equalizing the gas pressure within the chamber. This discontinuity introduced by the chamfered surface or surfaces not only promotes cross-flow between the ceramic blocks, it also creates turbulence in the spaces or voids provided by the chamfered surfaces between the blocks as the gas flow re-enters the gas passages to establish a unique flow pattern. In the most preferred embodiment, the ceramic blocks have a generally uniform height and the chamfered surfaces between the stacked ceramic blocks are at the same level or aligned within the chamber. The transient state of turbulence within the heat exchange chamber between the chamfered surfaces increases the local heat transfer substantially and because this increase in heat transfer occurs at every interface of the stacked ceramic blocks or packing, the overall heat transfer coefficient is greater than observed with equivalent prism-shaped ceramic blocks as described above.

The nonprismatic structured media of this invention thus provides several advantages over the prior prism-shaped blocks described above, particularly including improved efficiency and the nonprismatic packing of this invention eliminates the problems described above which result from structured prismatic beds. As will be understood, however, the nonprismatic ceramic blocks of this invention having chamfered faces may take several forms as described below. In one preferred embodiment, the end and side faces of the blocks are rectangular, wherein the blocks include at least four polygonal chamfered faces adjacent each end face. The chamfered surfaces or faces adjacent each end face of the ceramic blocks may be trapezoidal, wherein the edges are parallel and the sides taper inwardly from the side faces of the blocks to the end faces defining four chamfered edge surfaces adjacent each end face of the ceramic blocks. The chamfered surfaces may also be triangular, wherein the ceramic block includes eight triangular chamfered surfaces adjacent each end surface of the block. Alternatively, the end faces may be circular, wherein the blocks include a frustoconical chamfered edge face adjacent each end face of the blocks. At least two of the opposed side faces may also be arcuate or semicircular, such that the convex arcuate side faces nest into the concave arcuate faces of the adjacent ceramic blocks as further described below. As will be understood, the chamfered surface or surfaces on the ceramic blocks need not be located adjacent the end faces, but may be located in a midportion of the ceramic blocks provided the chamfered surfaces of the surrounding ceramic blocks are located at the same height or level to create gaps or voids between the adjacent ceramic blocks, which are preferably annular and surround the blocks. As set forth below, these chamfered surfaces may be any suitable configuration.

As will be understood, the cross-flow or redistribution of gas within the structured media bed and the degree of turbulence within the bed will depend upon the size of the chamfered surfaces relative to the size of the blocks. That is, the larger the chamfered surfaces compared to the end faces, where the chamfered surfaces are located at the end faces, the greater the cross-flow and redistribution of the gas within the bed. Thus, the size and shape of the chamfered surfaces of the nonprismatic ceramic blocks utilized in the improved gaseous pollution abatement system of this invention may be tailored to the application depending, for example, upon the size and shape of the reaction chambers to obtain optimum efficiency. However, in the preferred embodiment, the area of the chamfered faces of the ceramic blocks is equal to at least 20% of the cross-sectional area of the blocks and in the most preferred embodiment, the area of the chamfered face or faces is equal to or greater than the area of the end faces or 50% of the cross-sectional area of the blocks. Thus, in the most preferred embodiment, at least about 50% of the gas flowing through the bed of structured media or greater will circulate between the ceramic blocks assuring equalization of the gas pressure within the heat exchange chamber and providing turbulent flow in the gaps or voids defined by the chamfered surfaces, improving the heat transfer coefficient and thereby improving efficiency.

As will be understood, the area of the chamfered surface or surfaces will also depend upon the angle of the chamfered surfaces relative to the side faces. In the most preferred embodiment, the chamfered surfaces extend at an angle of between about 10 and 90 degrees to the side faces and in the most preferred embodiment, the chamfered surface extends at an angle of between 40 and 50 degrees relative to the side faces. As will be understood, a chamfer angle which is 90 degrees relative to the side surfaces will form a notch which must also be angled relative to the end faces at the end of the notch. As used herein, the term "chamfered" is intended to broadly define a surface or surfaces which cuts across the gas passages, including but not limited to a beveled edge or a notch located at the intersection between the top and side faces or at a midportion of the ceramic blocks.

The chamfered surface or surfaces of the blocks may be symmetrical for ease of manufacture. Where the chamfered surface or surfaces extend between the end faces and the side faces, the chamfered surface or surfaces at each end of the block may be identical or symmetrical. However, where the blocks are symmetrical, at least a portion of the gas passing through the stacked bed of ceramic blocks will be confined to flow through the passages through the end faces in laminar flow. That is, a portion of the gas will not flow into the voids and circulate through the bed. However, where the ceramic blocks are nonsymmetrical, such as where the chamfered surfaces at each end of the ceramic blocks is opposite an end face at the opposed end of the blocks, it is possible to circulate all of the gas flowing through the bed of stacked ceramic blocks through the voids between the chamfered faces, providing turbulent flow of all of the gas in the bed. In one preferred embodiment, each block includes at least two chamfered surfaces at each end of the ceramic blocks extending between the end and side surfaces, wherein the chamfered surfaces at one end of the blocks is a mirror image of the chamfered surfaces at the opposed end of the blocks. Stated another way, the chamfered surfaces at each end of the blocks is reversed so that all of the gas flowing through the bed of stacked ceramic blocks is circulated through voids between the blocks created by the adjacent chamfered surfaces.

The gaseous pollution abatement systems of this invention having improved nonprismatic structured chamfered blocks thus solves the problems associated with the prism-shaped ceramic heat exchange blocks described above while retaining the advantages of structured media over randomly oriented particulate ceramic elements. Other advantages and meritorious features of this invention will be more fully understood from the following description of the preferred embodiments, the appended claims and the drawings, a brief description of which follows.

DESCRIPTION OF THE PREFERRED EMBODIMENTS OF THIS INVENTION

As set forth above, the general construction of the gaseous pollution abatement system of this invention may be conventional. Where the gaseous pollution abatement system is a regenerative thermal oxidizer, the RTO includes a plurality of heat exchange chambers and a combustion chamber generally communicating with the heat exchange chambers. The improved nonprismatic structured media of this invention may be utilized with any type of gaseous pollution abatement system, including regenerative thermal oxidizers having two or more separate heat exchange chambers wherein the gas flow through the regenerative thermal oxidizer is controlled by a plurality of valves, sometimes referred to as a "multiple stack" regenerative thermal oxidizer as disclosed, for example, in the above-referenced U.S. patents assigned to the assignee of the present invention. The nonprismatic ceramic blocks of this invention may also be utilized in a rotary valve regenerative thermal oxidizer as illustrated schematically, for example, in FIG. 7. Alternatively, the improved nonprismatic ceramic blocks of this invention may be utilized in the reaction chamber of a selective catalytic reduction system, wherein the blocks include a suitable catalyst as described above.

Figure 7:
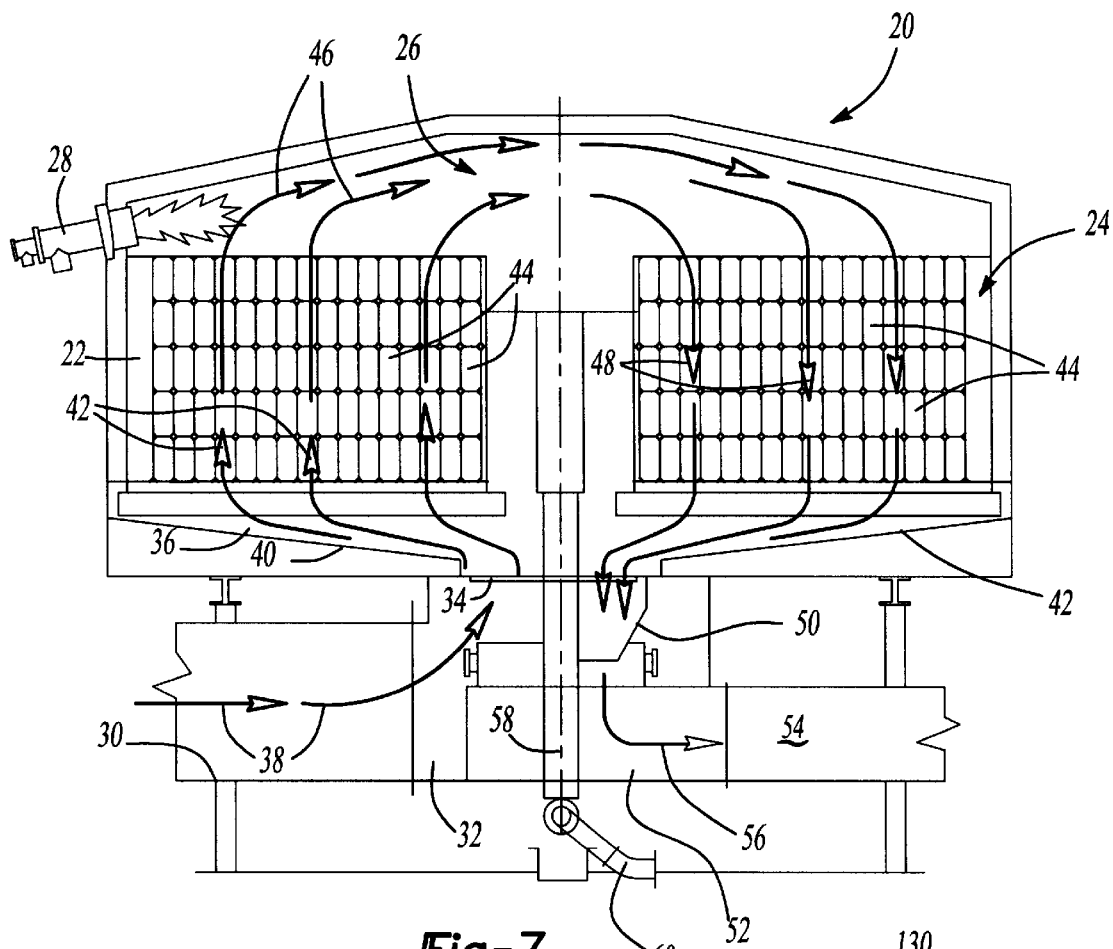
FIG. 7 is a schematic side illustration of a conventional rotary valve regenerative thermal oxidizer, wherein the heat exchange chambers are filled with the nonprismatic structured media of this invention.

The rotary valve regenerative thermal oxidizer 20 illustrated in FIG. 7 includes a plurality of heat exchange chambers, two of which are shown at 22 and 24. As set forth above, the heat exchange chambers of a conventional rotary valve regenerative thermal oxidizer are shaped like radial segments or slices of a pie. A typical rotary valve regenerative thermal oxidizer of the type shown in FIG. 7 generally includes eight to 12 heat exchange chambers. A conventional multiple stack regenerative thermal oxidizer generally includes two or three heat exchange chambers. In either type, however, the heat exchange chambers communicate with a combustion chamber 26 having a burner 28 as discussed further below.

In the embodiment of the rotary valve regenerative thermal oxidizer 20 shown in FIG. 7, the regenerative thermal oxidizer includes an inlet 30 which receives the gas to be treated, which is generally air having oxidizable pollutants as discussed above. The inlet 30 communicates with an inlet chamber 32 and the gas flows from the inlet chamber through an apertured plate 34 into an intermediate chamber 36 and the gas to be treated is then directed into the heat exchange chamber 22 in FIG. 7 by baffle plate 40 as shown by arrows 42. The gas to be treated then flows through the heat exchange media 44 where it is heated and the pollutants are oxidized as set forth above. The heated gas then flows into the combustion chamber 26 as shown by arrows 46 where any remaining pollutants are oxidized by burner 28. The cleansed heated gas then flows downwardly into the heat exchange chamber 24, through the heat exchange media 44 and is directed into the rotary valve 50 by baffle plate 42. The cleansed gas then flows into the outlet chamber 52 and is vented through duct 54 to atmosphere.

The flow of gas through the regenerative thermal oxidizer 20 is generated by the pressure differential between the inlet chamber 32 and the outlet chamber 52, wherein the gas pressure in the inlet chamber 32 is greater than the gas pressure in the outlet chamber. This pressure differential may be generated either by a blower (not shown) which forces the gas to be treated into the inlet 30 or by an exhaust fan connected to the duct 54 which communicates with the outlet plenum 52. In either event, the gas flows through the outlet plenum to duct 54 as shown by arrow 56. As will be understood by those skilled in this art, rotation of the rotary valve 50 will direct the cleansed gas received from a plurality of heat exchange chambers, such as heat exchange chamber 24, to the outlet chamber 52. In a typical rotary valve regenerative thermal oxidizer having 12 heat exchange chambers, five heat exchange chambers function as inlet heat exchange chambers, one of which is shown at 22, and five heat exchange chambers function as outlet heat exchange chambers, one of which is shown at 24. The remaining heat exchange chambers (not shown) located between the inlet and outlet heat exchange chambers, function as flush or purge chambers, wherein any pollutants remaining in the heat exchange media is flushed out of the heat exchange media in the purge chambers. Thus, as the rotary valve 50 rotates about vertical axis 58, each heat exchange chamber functions as an inlet chamber receiving the polluted gas to be treated, then as a flush chamber and finally as an outlet heat exchange chamber. The pollutants remaining in the purge chambers (not shown) located between the inlet and outlet heat exchange chambers are flushed either by directing clean air upwardly through valve 60, wherein the rotary valve 50 directs the clean air upwardly through the purge chambers and the pollutants are then flushed into the combustion chamber, or the rotary valve 50 may be configured to receive heated clean heated gas from the outlet chambers through the purge chambers and the gas is then circulated through valve 60 to the inlet 30 of the regenerative thermal oxidizer. As will be understood from the description above, however, the regenerative thermal oxidizer of this invention having chamfered or nonprismatic ceramic heat exchange blocks is not limited to any particular type of gaseous pollution abatement system.

Figure 1:
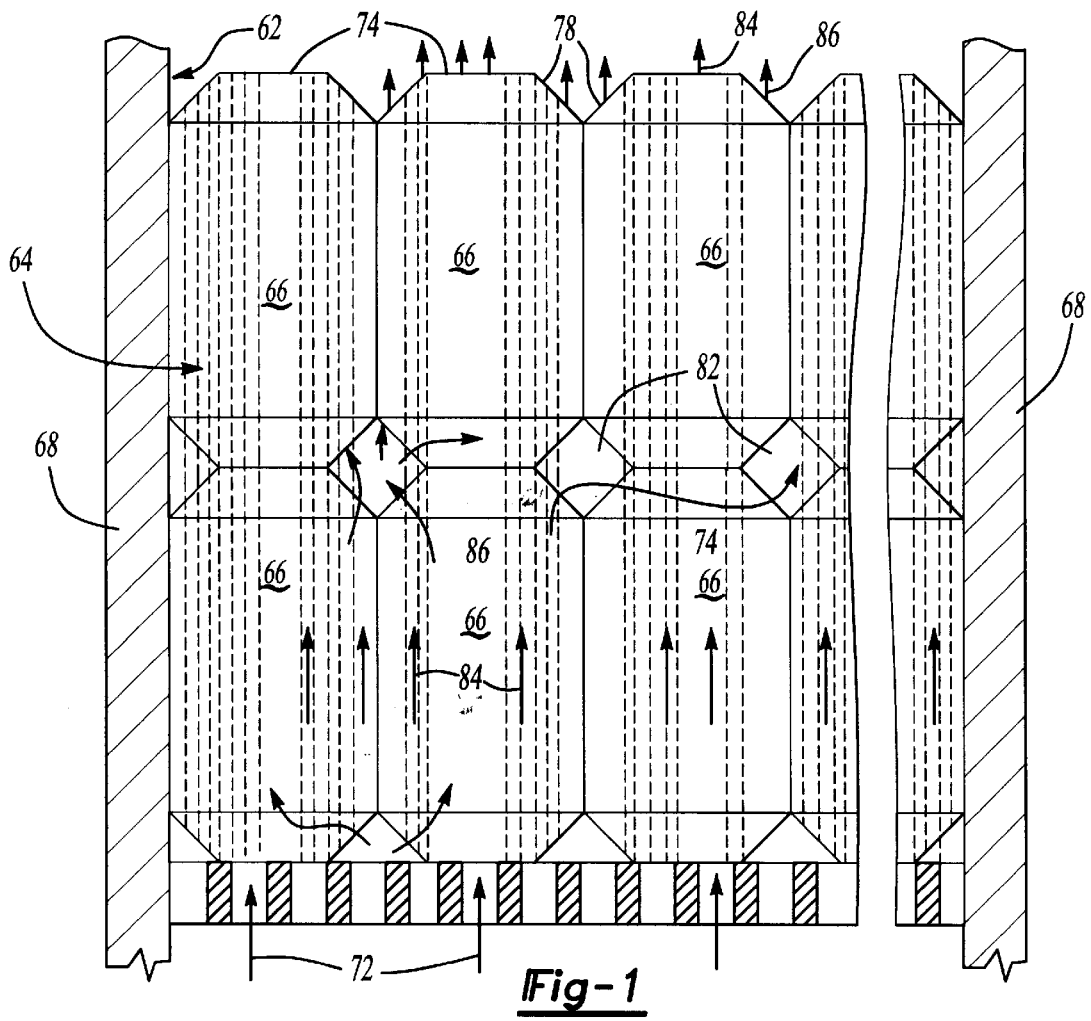
FIG. 1 is a side elevation of a reaction chamber of a gaseous pollution abatement system filled with one embodiment of the improved nonprismatic ceramic blocks of this invention illustrating redistribution of the gas flowing through the reaction chamber.
Figure 2:
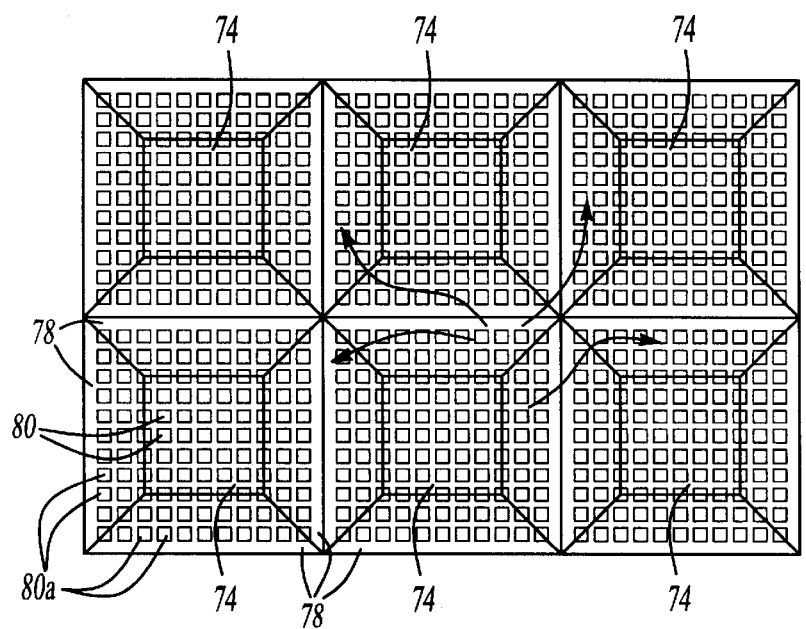
FIG. 2 is a top view of the nonprismatic ceramic blocks illustrated in FIG. 1.
Figure 3:
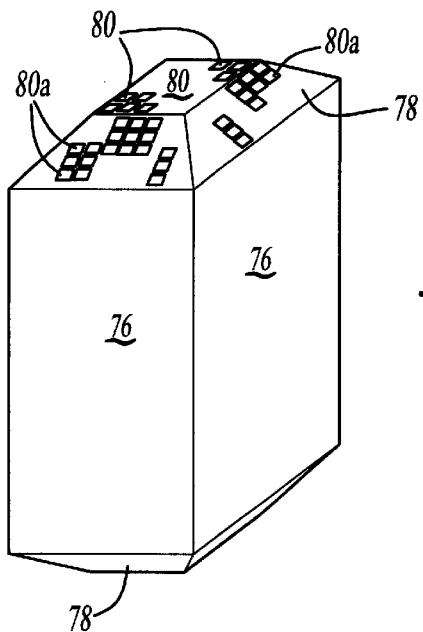
FIG. 3 is a side elevation of a ceramic block as shown in FIGS. 1 and 2.

FIG. 1 illustrates a reaction chamber 62 partially filled with a bed of reaction media 64. FIGS. 2 and 3 further illustrate one preferred embodiment of the nonprismatic ceramic blocks 66 of this invention shown in FIG. 1 and will be referred to in the description of the ceramic blocks 66. The reaction chamber 62 is enclosed by a partition wall or walls 68 and the media bed 64 is supported by a grate 70. As described above, in a rotary valve regenerative thermal oxidizer, such as shown at 20 in FIG. 7, the partition walls 68 in FIG. 1 define heat exchange chambers which are segments or slices of a pie, such that the partition walls 68 are inclined toward the axis 58 of the regenerative thermal oxidizer. However, in a multiple stack regenerative thermal oxidizer, the wall 68 may, for example, be cylindrical. In a selective catalytic reduction system, which has only one reaction chamber and no combustion chamber, the inlet may also be located adjacent the lower end. For ease of description only, it will be assumed that the heat exchange chamber 68 is an inlet heat exchange chamber of an RTO such as shown at 22 in FIG. 7 or a selective catalytic reduction reaction chamber. Thus, the gas to be treated enters the reaction chamber through grate 70 as shown by arrows 72. Of course, if the reaction chamber 62 is an outlet heat exchange chamber of an RTO as shown at 24 in FIG. 7, the gas flow will be in the opposite direction.

In the disclosed embodiment of the nonprismatic ceramic blocks 66 shown in FIGS. 1–3, the blocks 66 each include opposed end faces 74, perpendicular side faces 76 and chamfered edge faces or surfaces 78 which extend at an angle between the end and side faces 74 and 76 as best shown in FIGS. 2 and 3. Each of the ceramic blocks further include a plurality of spaced parallel gas passages 80 which extend through the ceramic blocks through the end faces 74 and the chamfered faces or surfaces 78 as best shown in FIGS. 2 at 80a. All of the gas passages are shown in FIG. 2 and the gas passages are only highlighted in the remaining Figures to simplify these views. In the preferred embodiments of the media bed 64, the ceramic blocks have substantially the same length measured between the end faces 74, as shown in FIG. 1, thereby creating annular spaces or voids 82 surrounding the end faces 74 as shown in FIG. 1. In the preferred embodiment of the ceramic blocks 66 shown in FIGS. 1–3, the annular voids 82 are rectangular because of the rectangular configuration of the end faces 74 and the flat trapezoidal shape of the chamfered end faces 78. However, as shown in FIG. 1, the cross-section of the voids 82 between the blocks is diamond-shaped.

The ceramic blocks 66 are stacked in side-to-side and end-to-end relation within the reaction chamber 62 as shown in FIG. 1, wherein the gas passages 80 through the opposed end faces 74 are preferably coaxially aligned. The gas flow through the reaction chamber 62 may now be described. As set forth above, the gas to be treated in the reaction chamber 62 flows through the grate 70 as shown by arrow 72. A portion of the gas then flows through the gas passages 80 as shown by arrows 84. However, a substantial portion of the gas flows through the chamfered edge faces 78 through passages 80a best shown in FIGS. 2 and 3. In the most preferred embodiments as further described hereinbelow, at least 20% of the gas flows through the gas passages 80a in the chamfered faces 78 or more preferably at least half of the gas is received through the chamfered faces 78. The gas received through the gas passages 80a is then received into the annular voids 82 which surround the end faces 74 of the ceramic blocks as shown by arrows 86. As set forth above, the chamfered surfaces 86 thereby provide cross-flow or redistribution of the gas flow through the media bed 64, equalizing the gas pressure in the reaction chamber, improving the overall thermal effectiveness or efficiency of the reaction media.

The chamfered surfaces 78 may also be located at a midportion of the ceramic blocks by providing, for example, a rectangular or V-shaped slot which cuts into the gas passages 80 forming chamfered surfaces having gas passages 80a therethrough. In this embodiment, it is important that the voids 82 are located at the same levels in the bed to assure gas circulation between the blocks in the bed. This can be accomplished, for example, by using rectangular ceramic blocks having the same length measured between the end faces and locating the chamfered surfaces at the center of the rectangular blocks. As described above, the ceramic blocks may also include a suitable catalyst, such as a noble or base metal catalyst, for reducing NOx in a media bed of a selective catalytic reduction system.

As shown in FIG. 7 and described above, the gas to be treated in an RTO is received from the inlet chamber 32 through apertured plate 34 which has a much smaller diameter than the intermediate chamber 36. Thus, the velocity of the gas entering the heat exchange media adjacent the apertured plate 34 will be greater than the velocity of the gas entering the heat exchange media spaced further from the inlet and may carry more pollutants. Further, as described above, there will be a substantial pressure differential between the gas entering the heat exchange media adjacent the apertured plate 34 and the heat exchange media spaced further from the apertured plate. However, this pressure differential is equalized within the heat exchange chamber 62 of an RTO by the gas flowing through the chamfered edge surfaces 78 which permit redistribution or cross-flow of the gas between adjacent ceramic heat exchange blocks 66 as shown by arrows 86. Further, as described above, the gas flow through the voids 82 becomes turbulent, increasing the overall thermal efficiency of the media bed as compared to prism-shaped blocks. As disclosed in the above-referenced U.S. patents, all of the flow through the prismatic heat exchange bed is confined to the aligned heat exchange passages 80 through the end faces of the heat exchange blocks.

As set forth above, the reaction chamber 62 shown in FIG. 2 may also be a catalytic reaction chamber of a selective catalytic reduction system, wherein the ceramic blocks include a suitable catalyst for reducing NOx. The nonprismatic ceramic catalytic blocks in this embodiment having chamfered surfaces 78 also provide improved destruction efficiency over prismatic blocks because of the better distribution of gas across the bed resulting and more uniform temperatures in the bed. That is, each portion of the media bed 64 sees a similar amount of gas because of the improved circulation of gas through the bed.

Figure 4:
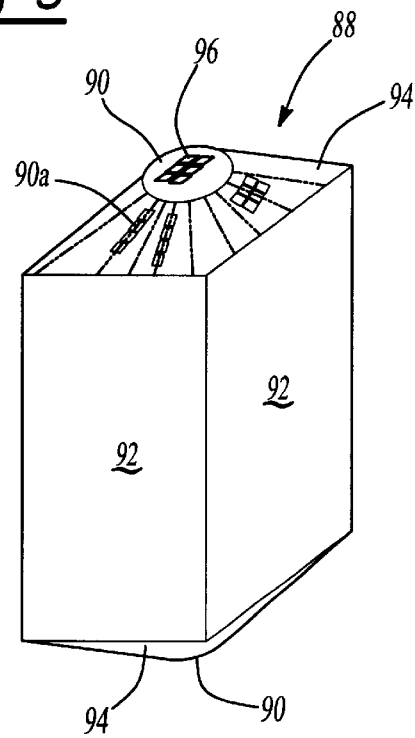
FIG. 4 is a side elevation of an alternative embodiment of a nonprismatic ceramic block.
Figure 5:
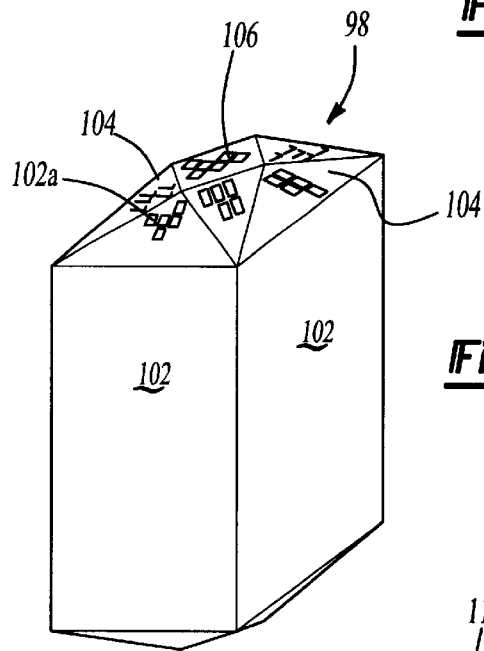
FIG. 5 is a side elevation of an alternative embodiment of a nonprismatic ceramic block.
Figure 6:
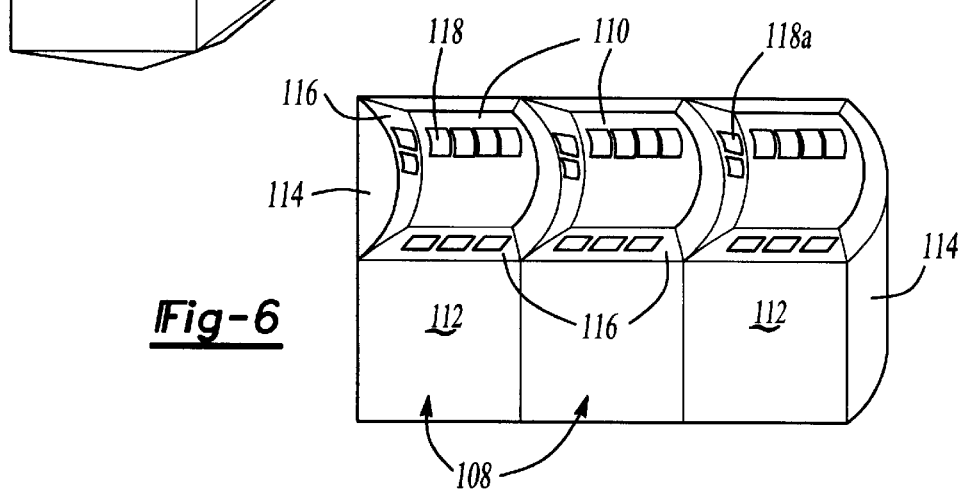
FIG. 6 is a top elevation of an alternative embodiment of nonprismatic ceramic blocks.

FIGS. 4–6 illustrate alternative embodiments of the ceramic blocks of this invention. In FIG. 4, the ceramic blocks 88 include opposed circular end faces 90 and four rectangular side faces 92. In this embodiment, the chamfered edge face 94 is frustoconical and the gas passages 96 extend through the end faces 90 and the frustoconical chamfered face 94 as shown at 90a. The ceramic block 88 shown in FIG. 4 may be stacked as shown in FIG. 1, wherein the end faces 90 are aligned, such that the gas passages 96 through the end faces are coaxially aligned as described above.

In FIG. 5, the ceramic blocks 98 include opposed rectangular end faces 100, four rectangular side faces and eight triangular chamfered edge faces 104. The blocks include parallel spaced gas passages 106 through the end faces 100 and gas passages 106a through the triangular chamfered surfaces 104. Again, the blocks 98 are stacked in a media bed 64 as shown in FIG. 1 with the gas passages 106 through the end faces 100 substantially coaxially aligned and the side faces in mating contact as shown in FIG. 2.

The embodiment of the ceramic blocks 108 shown in FIG. 6 include opposed flat end faces 110 which permit stacking of the ceramic blocks as described above in regard to FIG. 1. However, in this embodiment, only two of the opposed side faces are flat and rectangular. The opposed side faces 114 are arcuate or semicircular, such that the arcuate surfaces nest into the adjacent blocks as shown in FIG. 6. The chamfered faces 116 extend at an angle to the side and end faces as described above and the gas passages 118 extend through the ceramic blocks through the end faces and through the chamfered faces as shown at 118a.

As will be understood, however, the nonprismatic ceramic blocks 66 shown in FIGS. 1–3, 88 shown in FIG. 4, 98 shown in FIG. 5 and 108 shown in FIG. 6 all have common elements including opposed end faces, at least four side faces extending generally perpendicular to the end faces, a chamfered edge face or surfaces extending at an angle between the end and side faces and gas passages extending through the ceramic blocks through the end faces and the chamfered edge faces. As set forth above, however, the chamfered surface or surfaces may also be located at a midportion of the ceramic blocks. Further, in each of these embodiments, the side faces have approximately the same width to permit stacking of the ceramic blocks inside-to-side relation as described. However, the size or area of the chamfered surface or surfaces relative to the end faces various with each embodiment. In the embodiment of the ceramic blocks 66 shown in FIGS. 1–3, the combined area of the four trapezoidal chamfered surfaces 78 is at least equal to or greater than the area of the end faces 74 as best shown in FIGS. 2 and 3. Stated another way, the combined area of the chamfered surfaces 78 is at least equal to one-half the cross-sectional area of the blocks. Thus, in this embodiment, at least one-half of the gas flowing through the media bed 64 is permitted to circulate between the blocks, thereby equalizing the pressure within the heat exchange chamber 62 and promoting turbulent flow through the voids 82 as described above. In the embodiments of the heat exchange blocks 88 in FIG. 4 and 98 in FIG. 5, the area of the chamfered face or surface 94 in FIG. 4 and 104 in FIG. 5, is substantially greater than the area of the end faces 90 in FIG. 4 and 100 in FIG. 5 or about two-thirds the cross-sectional area of the blocks. The area of the chamfered surface in these embodiments is about twice the area of the end faces. Finally, the combined area of the chamfered edge surfaces 116 of the ceramic heat exchange blocks 108 shown in FIG. 6 is less than the area of the end faces or about 20%. Thus, the area of the chamfered surface or surfaces of the disclosed embodiments of the ceramic blocks compared to the end faces ranges from about 20% to about 500%.

Figure 9:
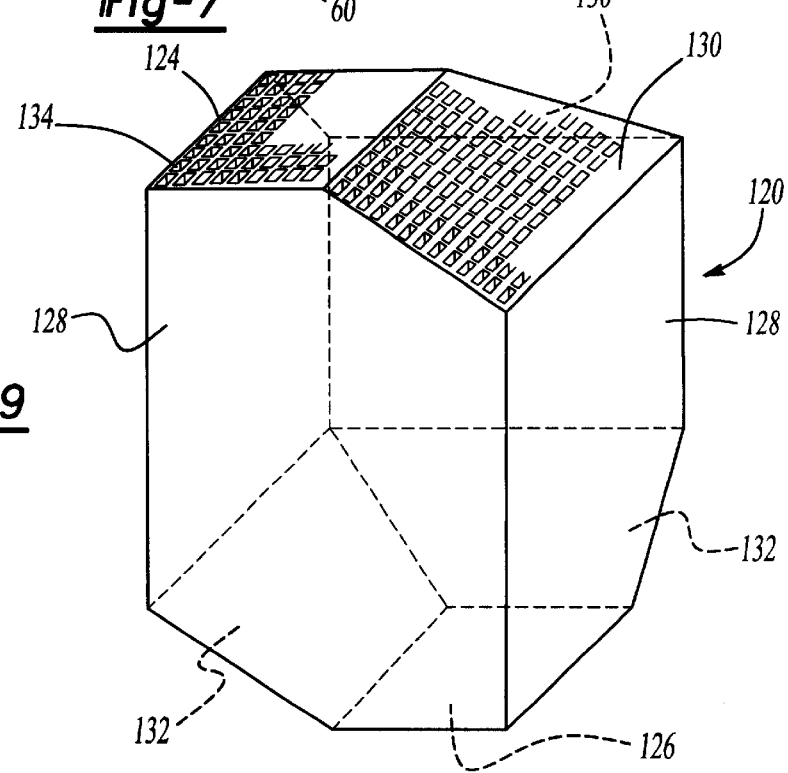
FIG. 9 is a top elevation of a ceramic block in the bed of ceramic blocks illustrated in FIG. 8.
Figure 8:
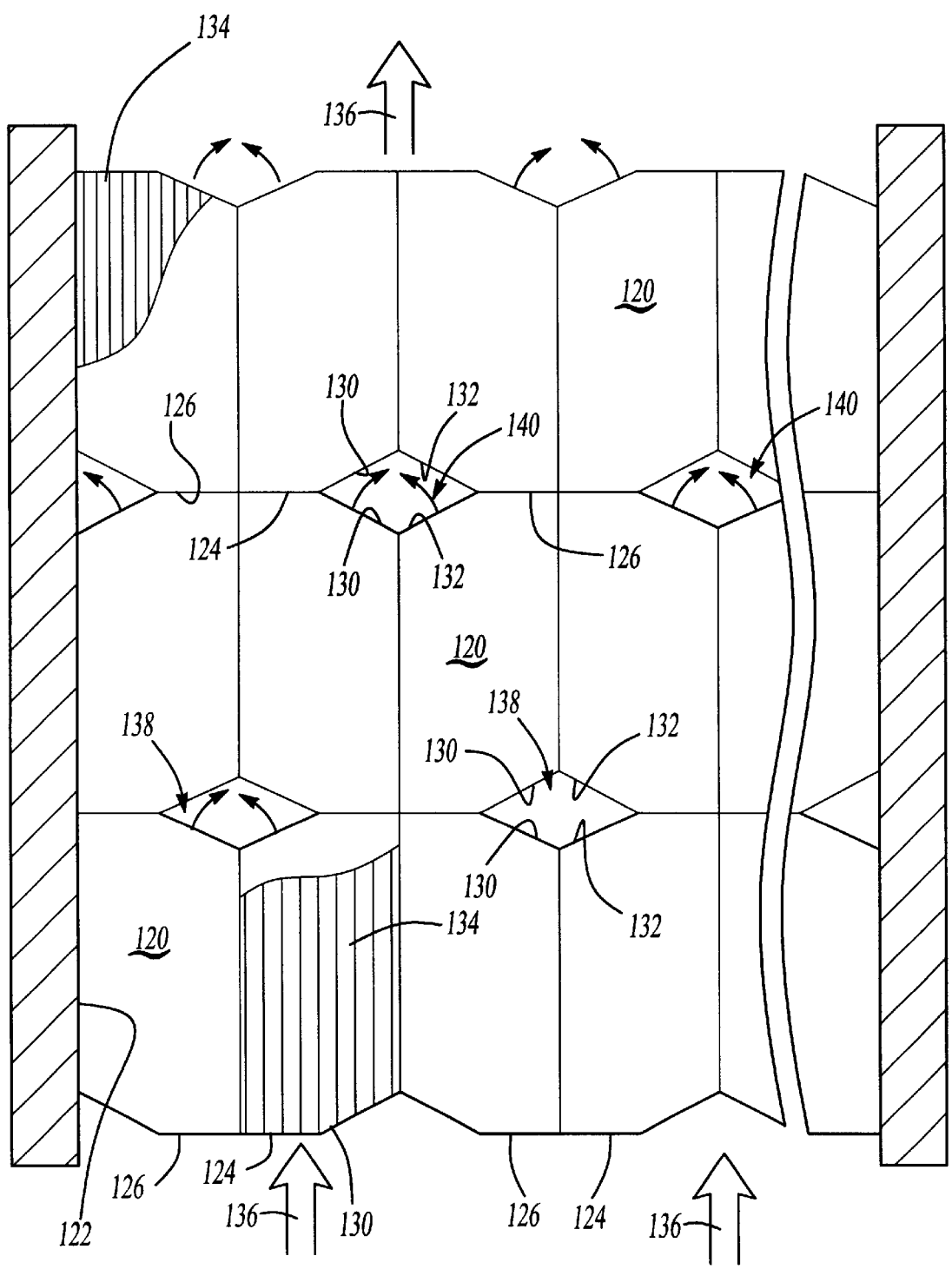
FIG. 8 is a side view of a reaction chamber of a gaseous pollution abatement system filled with nonprismatic nonsymmetrical ceramic blocks, wherein a portion of the ceramic blocks is broken away to illustrate the gas passages.

FIGS. 8 and 9 illustrate the use of nonsymmetrical non-prismatic ceramic blocks 120 in a reaction chamber 122 of the type described above, wherein all of the gas is circulated through the voids created by the chamfered surfaces. Each of the blocks 120 includes opposed end faces 124 and 126, which may be parallel as shown to facilitate stacking, four transverse side faces 128, and two chamfered side faces 130 adjacent one end face 24 and 132 adjacent the opposite end face 126. As best shown in FIG. 9, the chamfered surfaces or faces 132 are the mirror images of the chamfered faces 130, such that the ceramic blocks 120 are nonsymmetrical. That is, the end face 124 is not aligned vertically with the end face 126. Instead, the chamfered face 130 is vertically aligned with the end face 126 and the chamfered face 132 is vertically aligned with the end face 124. This alignment assures circulation of all of the gas into the voids between the chamfered surfaces as now described in regard to FIG. 8.

As shown in FIG. 8, the gas enters the reaction chamber 122 as shown by arrows 136. The gas then passes through the passages 134 through the end and chamfered faces 124 and 130, respectively, as shown by arrow 136. As shown in FIG. 8, the ceramic blocks 120 may be stacked in the reaction chamber with the end faces in face to face contact. However, each column of ceramic blocks is reversed relative to the adjacent column to form diamond-shaped voids adjacent the end faces by orienting the blocks as shown in FIG. 8. That is, the chamfered faces 130 adjacent the end faces 124 are adjacent to one another in one course or level of ceramic blocks and the chamfered faces 132 in the next course of blocks are adjacent one another, as shown. The gas passing through the channels 134 enters the void 138. In the next level, the gas passing through the end faces 126 are directed into a second series of voids 140. Thus, all of the gas passing through the bed of ceramic blocks 120 will be directed into voids between the blocks at alternative levels. This configuration thus provides a further improvement in thermal efficiency for the bed of ceramic blocks in an RTO or SCR and further improve the destruction efficiency of an SCR.

The illustrated ceramic blocks may be cast, extruded or assembled from any suitable ceramic material able to withstand the extreme heat variations encountered in gaseous pollution abatement systems, as is known in the prior art. Further, the configuration and size of the gas passages may be generally the same as conventional prism-shaped ceramic blocks as described, for example, in the above-referenced U.S. patents. As stated above, the height or length of the nonprismatic ceramic blocks measured between the end faces may also be conventional, wherein the length measured between the end faces is about 300 mm and the side faces may have a width of about 150 mm.

The gaseous pollutant abatement system of this invention having improved nonprismatic ceramic blocks with chamfered faces of this invention thereby solves the problems associated with prism-shaped ceramic blocks while retaining the advantages of the structured media disclosed in the above-referenced U.S. patents and described above. Having described several preferred embodiments of the nonprismatic ceramic blocks, it will be understood that various modifications may be made to these blocks and the media bed formed by the ceramic blocks in the reaction chambers. In a typical application, wherein the configuration of the media bed of ceramic blocks is rectangular and different from the configuration of the reaction chambers, a castable refractory may be poured between the ceramic blocks and the side wall or partitions of the chambers to assure that all of the gas passes through the media bed. Further, as will now be understood, the configuration of the ceramic blocks may be made in other shapes including, for example, blocks having triangular end faces provided the blocks are stackable to substantially fill the heat exchange chambers, as described. The nonprismatic ceramic blocks may be utilized in any type of gaseous pollution abatement system including regenerative thermal oxidizers and selective catalytic reduction systems wherein the ceramic blocks include a suitable catalyst. Further, the chamfered surface or surfaces may be located adjacent the end faces of the blocks as shown or the chamfered surfaces may be located at a midportion of each of the blocks to form a plurality of annular voids at a plurality of spaced levels in the media bed.

Having thus described the preferred embodiments of the pollution abatement reactor having improved nonprismatic heat exchange blocks of this invention, it will be understood that this invention is limited only to the claims, which follow.

What is claimed is:

1. An apparatus for treating gas having entrained pollutants including at least one reaction chamber substantially filled with a reaction media bed, said reaction media bed receiving gas to be treated therethrough, said reaction media bed comprising a plurality of generally rectangular ceramic blocks each having opposed end faces, generally parallel side faces and generally parallel gas passages extending through said blocks through said end faces, said ceramic blocks stacked in side-to-side and end-to-end relation within said reaction chamber with said gas passages through said end faces generally coaxially aligned forming a reaction media bed of ceramic blocks with a portion of said gas flowing through said media bed through said gas passages, and said ceramic blocks further including chamfered edge faces extending at an angle between at least one of said side faces and each of said opposed end faces having gas passages extending therethrough, said chamfered edge faces thereby providing gas flow through said chamfered edge faces and between said ceramic blocks equalizing the gas pressure within said reaction chamber.

2. The apparatus defined in claim 1, wherein each of said ceramic blocks has at least two chamfered edge faces adjacent said end faces.

3. The apparatus defined in claim 1, wherein said ceramic blocks have four rectangular side faces, two rectangular end faces and at least four chamfered edge faces adjacent each of said end faces.

4. The apparatus defined in claim 3, wherein the combined area of said chamfered edge faces of said ceramic heat exchange blocks is at least equal to 20 percent of the area of said end faces.

5. The apparatus defined in claim 3, wherein the combined area of said chamfered edge faces is equal to or greater than the area of said end faces.

6. The apparatus defined in claim 1, wherein at least two opposed side faces of said ceramic blocks are arcuate and nest into the arcuate faces of the adjacent ceramic blocks.

7. The apparatus defined in claim 1, wherein said end faces of said ceramic blocks are generally circular and said chamfered face is frustoconical surrounding said end face.

8. The apparatus defined in claim 7, wherein said side faces of said ceramic blocks area rectangular.

9. The apparatus defined in claim 1, wherein said end and side faces of said ceramic blocks are rectangular and each of said ceramic blocks has at least four chamfered edge faces.

10. The apparatus defined in claim 9, wherein said chamfered edge faces are flat and extend at an angle of between 10 and 90 degrees to said side faces.

11. The apparatus defined in claim 1, wherein the area of said chamfered edge face is equal to or greater than the adjacent end face.

12. The apparatus as defined in claim 1, wherein each of said blocks includes at least one chamfered face adjacent each of said end faces extending between said end faces and said side faces.

13. The apparatus as defined in claim 12, wherein each of said chamfered faces is located vertically opposite an end face and said blocks are stacked in said reaction chamber with said end faces contacting one another in face to face contact forming voids between each course of ceramic blocks, and wherein all of the gas flowing through said stacked ceramic blocks in said reaction chamber flows into said voids.

14. A regenerative thermal oxidizer including at least two heat exchange chambers each having heat exchange media therein and a combustion chamber communicating with said heat exchange chambers, one of said heat exchange chambers periodically receiving gas to be treated which flows through said one of said heat exchange chambers into said combustion chamber thereby treating said gas and the treated gas then flowing through the other of said heat exchange chambers thereby heating the heat exchange media in said other of said heat exchange chambers, said heat exchange media comprising a plurality of generally rectangular ceramic heat exchange blocks each having opposed end faces generally parallel, side faces and generally aligned gas passages extending through said ceramic heat exchange blocks through said end faces, said ceramic heat exchange blocks stacked in side-to-side and end-to-end relation within each of said heat exchange chambers with said gas passages through said end faces generally coaxially aligned forming a bed of ceramic heat exchange blocks in said heat exchange chambers with all of said gas flowing through said bed through said gas passages, and said ceramic heat exchange blocks further including chamfered surfaces extending at an angle relative to at least one of said side faces and each of said opposed end faces having an area equal to at least 20 percent of the area of said end faces and said gas passages extending through said chamfered surfaces, thereby providing gas flow through said chamfered surfaces and between said heat exchange blocks to equalize the gas pressure within said heat exchange chambers.

15. The regenerative thermal oxidizer defined in claim 14, wherein each of said ceramic heat exchange blocks has at least two chamfered edge surfaces extending between said side faces and said one of said end faces.

16. The regenerative thermal oxidizer defined in claim 14, wherein said ceramic heat exchange blocks each have four rectangular side faces, two rectangular end faces and at least two chamfered surfaces.

17. The regenerative thermal oxidizer defined in claim 16, wherein the combined area of said chamfered surfaces is equal to or greater than the area of said end faces.

18. The regenerative thermal oxidizer defined in claim 14, wherein at least two opposed side faces of said ceramic heat exchange blocks are arcuate and nest into the arcuate faces of the adjacent ceramic heat exchange blocks.

19. The regenerative thermal oxidizer defined in claim 14, wherein said end faces of said ceramic heat exchange blocks are generally circular and said chamfered edge surface is frustoconical, surrounding said end face.

20. The regenerative thermal oxidizer defined in claim 19, wherein said side faces of said ceramic heat exchange blocks are rectangular.

21. The regenerative thermal oxidizer defined in claim 14, wherein each of said ceramic heat exchange blocks has at least four chamfered surfaces surrounding said blocks.

22. The regenerative thermal oxidizer defined in claim 14, wherein said area of said chamfered surface is equal to or greater than the area of one of said end faces.

23. The regenerative thermal oxidizer defined in claim 14, wherein the lengths of said ceramic heat exchange blocks are approximately equal thereby aligning said chamfered surfaces of said ceramic heat exchange blocks in said heat exchange chambers forming voids therebetween.

24. The regenerative thermal oxidizer defined in claim 14, wherein each of said blocks includes at least one chamfered surface adjacent each of said end faces extending between said end faces and said side faces.

25. The regenerative thermal oxidizer defined in claim 24, wherein said chamfered faces are located vertically opposite an end face and said blocks are stacked in said heat exchange chambers with said end faces contacting one another in face to face contact forming voids between each course of ceramic heat exchange blocks and wherein all of the gas flowing through said heat exchange chambers flows into said voids.

26. An apparatus for removing gaseous pollutants in an air stream including at least one reaction chamber substantially filled with a reaction media bed, said reaction media bed receiving gas therethrough, said reaction media bed comprising a plurality of generally rectangular ceramic blocks each having opposed end faces and generally parallel side faces, said ceramic blocks being of approximately the same length measured between said end faces and stacked in end-to-end and side-to-side relation forming a bed of said ceramic blocks within said reaction chamber, said ceramic blocks including chamfered faces extending at an angle relative to at least one of said side faces and each of said opposed end faces, and generally parallel gas passages extending through said ceramic blocks through said end and chamfered faces with said gas passages through said end faces substantially coaxially aligned, and said chamfered faces of said ceramic blocks being substantially aligned within said reaction chamber defining voids between said stacked ceramic blocks, and said gas passing through said gas passages through said chamfered face into said voids and circulating between said ceramic blocks substantially equalizing the gas pressure within said reaction chamber.

27. The apparatus as defined in claim 26, wherein said apparatus is a regenerative thermal oxidizer including at least two heat exchange reaction chambers substantially filled with said ceramic heat exchange blocks, and said chamfered faces of said ceramic blocks surrounding said blocks and forming annular voids within said bed of stacked ceramic blocks at spaced locations.

28. The apparatus as defined in claim 26, wherein said apparatus is a selective catalytic reduction system including at least one catalytic reaction chamber substantially filled with ceramic blocks including a catalyst on an inside surface of said gas passages and said chamfered face of each of said ceramic blocks surrounding said blocks and forming annular voids within said bed at spaced locations.

29. The apparatus as defined in claim 26, wherein said chamfered face of each of said ceramic blocks is adjacent said end faces forming voids adjacent said end faces of said stacked ceramic blocks within said media bed.

30. The apparatus as defined in claim 26, wherein each of said ceramic blocks includes at least two chamfered faces extending at an angle of between 10 and 90 degrees relative to said side faces of said ceramic blocks and forming voids at spaced levels within said bed.

31. The apparatus as defined in claim 26, wherein said chamfered face of each of said blocks extends at an angle between said end and side faces adjacent said end faces of said blocks forming voids between said stacked ceramic blocks adjacent said end faces.

32. The apparatus as defined in claim 31, wherein each of said ceramic blocks has four rectangular side faces, two rectangular end faces and at least two chamfered edge faces extending between said side and end faces adjacent said end faces.

33. The apparatus as defined in claim 32, wherein the combined area of said chamfered edge faces of said ceramic blocks is equal to at least 20% of the area of said end faces.

34. The apparatus as defined in claim 32, wherein said combined area of said chamfered faces is equal to or greater than the area of said end faces.

35. The apparatus as defined in claim 26, wherein said end faces of said ceramic blocks are generally circular and said chamfered face is frustoconical extending between said side faces and said end faces surrounding said end faces.

36. The apparatus as defined in claim 26, wherein each of said blocks includes at least one chamfered face adjacent said end faces extending at an angle between said end faces and said side faces.

37. The apparatus as defined in claim 36, wherein said ceramic faces are located vertically opposite an end face and said blocks are stacked in said reaction chamber with said end faces contacting one another in face to face contact forming voids between each course of said ceramic blocks with all of the gas flowing through said stacked ceramic blocks into said voids.

38. An apparatus for treating gas having entrained pollutants including at least one reaction chamber substantially filled with a reaction media bed, said reaction media bed receiving gas to be treated therethrough, said reaction media bed comprising a plurality of generally rectangular ceramic blocks each having opposed end faces, generally parallel side faces and generally parallel gas passages extending through said blocks through said end faces, said ceramic blocks stacked in side-to-side and end-to-end relation within said reaction chamber forming a plurality of stacked courses of ceramic blocks, each of said ceramic blocks including chamfered faces extending from a side face to each of said end faces forming chamfered faces adjacent each of said end faces with said chamfered faces aligned with an end face in an adjacent course of said stacked ceramic blocks, thereby providing gas flow through said chamfered faces and between said ceramic blocks equalizing the gas pressure within said reaction chamber.

39. The apparatus as defined in claim 38, wherein each of said chamfered faces of each ceramic block in each of said course of stacked ceramic blocks is opposite a chamfered face of an adjacent ceramic block.

40. The apparatus as defined in claim 38, wherein each of said ceramic blocks includes two adjacent chamfered surfaces adjacent each of said end faces extending from one of said side faces to each of said end faces.

41. The apparatus as defined in claim 40, wherein each of said ceramic blocks are generally rectangular having chamfered faces adjacent each of said side faces and two side faces perpendicular to said end faces.

* * * * *